(12) United States Patent
Howayshell (10) Patent No.: US 7,617,725 B2
(45) Date of Patent: Nov. 17, 2009

(54) ELECTRIC GENERATOR PROTECTION SYSTEM

(76) Inventor: Fahed Al Howayshell, B:5 St: 26 H:6, Hadiya (KW)

( * ) Notice: Subject to any disclaimer, the term of this patent is extended or adjusted under 35 U.S.C. 154(b) by 306 days.

(21) Appl. No.: 11/683,748

(22) Filed: Mar. 8, 2007

(65) Prior Publication Data
US 2008/0218363 A1    Sep. 11, 2008

(51) Int. Cl.
G01F 23/30 (2006.01)
G01F 23/00 (2006.01)

(52) U.S. Cl. .............. 73/322; 73/308; 73/313
(58) Field of Classification Search .......... 73/308, 73/313; 340/624, 623
See application file for complete search history.

(56) References Cited

U.S. PATENT DOCUMENTS

| | | | |
|---|---|---|---|
| 3,543,580 A * | 12/1970 | Mcgill | 73/313 |
| 4,459,584 A * | 7/1984 | Clarkson | 340/624 |
| 4,641,523 A * | 2/1987 | Andreasson | 73/313 |
| 5,111,691 A * | 5/1992 | John et al. | 73/292 |
| 6,218,949 B1 * | 4/2001 | Issachar | 340/624 |
| 6,988,406 B1 * | 1/2006 | Mack | 73/313 |
| 2005/0279772 A1 * | 12/2005 | Speight | 222/333 |

* cited by examiner

Primary Examiner—Hezron Williams
Assistant Examiner—Nathaniel Kolb
(74) Attorney, Agent, or Firm—Lowe Hauptman Ham & Berner, LLP (57) ABSTRACT

A protection system for an electric generator includes a fluid sensor to measure a fluid level in a fuel tank, an indicator lamp to display the fluid level, a timer to measure a time interval beginning in response to a low fuel signal from the fluid sensor and a low fuel switch to shut off the electric generator at the end of the time interval.

3 Claims, 11 Drawing Sheets

ELECTRIC GENERATOR PROTECTION SYSTEM

FIELD OF THE INVENTION

This invention relates to electric generators and more particularly to protection systems for electric generators.

BACKGROUND

Small-scale electric generation, such as backup, standby and emergency generators, are used in many locations. The electric generators must be maintained by an operator to monitor fuel, oil and temperature levels. In some cases, alarms might alert the operator that the electric generator might be running low on fuel. However, by the time the operator becomes aware of the low fuel condition, the electric generator could run out of fuel before fuel supplies are replenished and/or may not be able to safely shut-down electrical loads before a power system disruption.

Fuel level detectors for warning an individual of a low fuel supply are well known. For example, a Hara, U.S. Pat. No. 4,175,435 discloses a liquid level detection device. As disclosed a liquid level detection device comprises an annular float adapted to float constantly on the surface of a body of liquid subjected to level detection, a barrel passing through the float to guide the motion of the float, permanent magnets disposed in the float and a magnetically operable lead switch disposed in the barrel permits the detection of the liquid level. The device works on the principle that the lead switch is magnetically turned into it's on state at the time that the float while in motion reaches the position at which the barrel incorporates the switch.

A more recent patent of Wickman et al., U.S. Pat. No. 6,253,742 discloses a method for controlling the operation of a fuel system that uses a lift pump. The system uses a lift pump to transfer fuel from a remote tank to a vapor separator tank. Only one level sensor is provided in the vapor separator tank and an engine control unit monitors the total fuel usage subsequent to the most recent filling of the tank. When the fuel usage indicates that the fuel level in the vapor separator tank has reached a predetermined lower level, a lift pump is activated to draw fuel from a remote tank and provide that fuel to the vapor separator tank.

Notwithstanding the above, it is presently believed that there is a need and a potential commercial market for a protection system for an electric generator in accordance with the present invention. There should be a demand for such systems for use with electrical generators to protect the generators from running out of fuel and shutting down prematurely.

SUMMARY

In essence, a protection system for an electric generator includes a fluid sensor to measure a fluid level in a fuel tank, an indicator lamp to display the fluid level, a timer to measure a time interval beginning in response to a low fuel signal from the fluid sensor and a low fuel switch to shut off the electric generator at the end of the time interval.

Embodiments of the invention may include one or more of the following features. For example, the fluid sensor may include a float, a conductor block, a rod to attach the float to the conductor block and spring contacts to contact the conductor block thereby causing an electric current to illuminate an indicator lamp.

As another feature, an isolation wall may have a port that receives the rod and that separates the spring contacts from the volume of the fuel tank.

The indicator lamp may also include a green lamp to indicate a nearly full fluid level, a yellow lamp to indicate an approximately half full fluid level and a red lamp to indicate an almost empty fluid level. The green, yellow and red lamps may be green, yellow and red LEDs, respectively.

The timer may also include a clock that measures a time interval and an output circuit that issues a shut-off signal at the end of the timer interval.

The protection system may also include an audible alarm to indicate a low liquid level in the fuel tanks.

A battery may provide backup electric power for the protection system to operate the indicator lamp, alarm, fuel sensor, timer and switches. In addition, a solar cell and a battery charger can be used to recharge the battery.

Additional protection features include a thermal sensor and a high temperature switch to shut of the electric generator in response to a high temperature signal from a thermal sensor.

The fuel tank may also be supplemented by a reserve fuel tank and a pump to transfer fluid from the reserve fuel tank to the fuel tank. The pump transfers the fuel to the fuel tank in response to the low fuel signal from the fluid sensor.

In another general aspect, the protection system for an electric generator includes a float to measure a fluid level in a fuel tank, a conductor block, an arm to attach the float to the conductor block and spring contacts to contact the conductor block, a set of indicator green, yellow and red LED lamps receiving signals from the fluid sensor to indicate a high fluid level, a half full fluid level and a nearly empty fluid level, respectively, a timer to measure a time interval beginning in response to a low fuel signal from the fluid sensor, a low fuel switch to shut off the electric generator at the end of the time interval and an audible alarm to indicate a nearly empty fluid level. The protection systems in accordance with the present invention may include any of the above features.

In another general aspect, a method of protecting an electric generator from a low fuel condition includes sensing a fluid level in a fuel tank of the electric generator, measuring a time interval beginning in response to a sensed low fluid level and shutting off the electric generator at the end of the measured time interval.

The method may include any of the above or following features. For example, the method may include displaying the fluid level.

The invention will now be described in connection with the accompanying drawings wherein like reference numerals have been used to designate like parts.

DETAILED DESCRIPTION OF THE PREFERRED EMBODIMENTS

Figure 1:
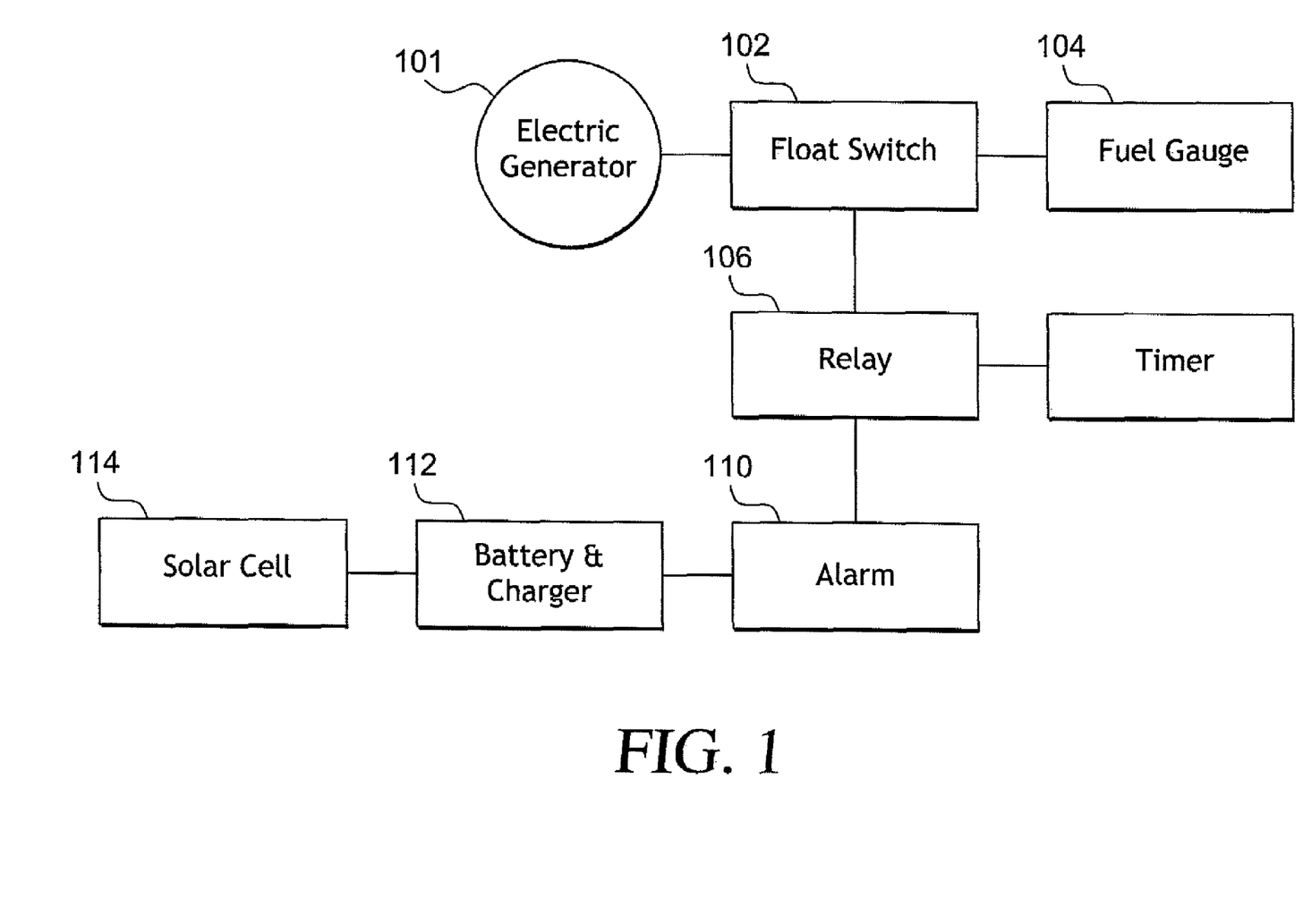
FIG. 1 is a block diagram of an electric generator with a protection system.

Referring to FIG. 1, an electric generator with a protection system in accordance with the present invention includes an electric generator 101 with a fuel tank (not shown) that incorporates a float switch 102. The float switch 102 provides information about the amount of fuel in the fuel tank to a fuel level gauge or display 104 and to a relay 106.

The relay 106 is operable to trigger a timer 108 which can issue a shut-off signal to the electric generator 101. The relay 106 also triggers an audible alarm 110 which notifies an operator of a low fuel condition. The alarm 110 is connected to a battery and battery charger which is provided with an electrical charge via a solar cell 114.

Figure 2:
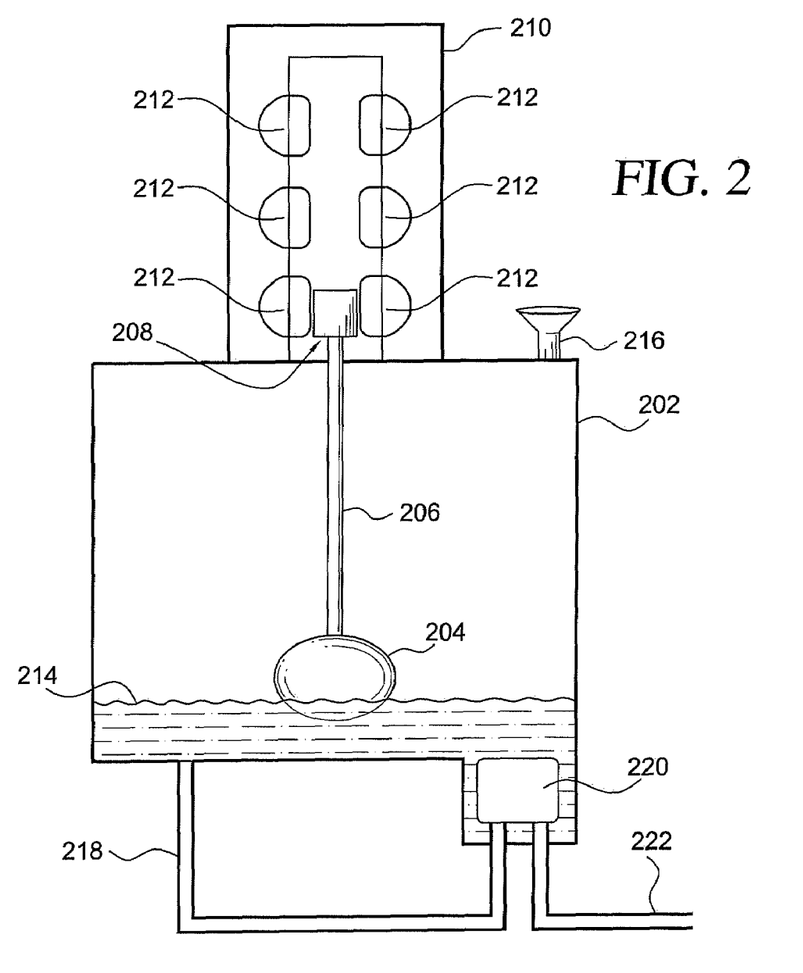
FIG. 2 is cross-section view of a fuel tank with a fuel level sensor.

Referring to FIG. 2, the float switch 102 is located in the fuel tank 202. The float switch includes a float 204, a rod or pipe 206, and a conductor block 208. The conductor block 208 moves up and down inside a housing 210 which encloses pairs of electrical spring contacts 212. The position of the conductor block 208 varies depending on the fuel level 214 causing the conductor block to complete an electrical connection through a pair of the spring contacts 212. Each pair of spring contacts is connected to a lamp or light emitting diode (LED) which is lit to indicate the amount of fuel left in the tank 202.

Fuel can be added to the fuel tank 202 through a filling port 216 at the top of the fuel tank 202. A first fuel line 218 feeds a fuel pump 220 which pumps fuel through a second fuel line 222 to the electric generator 101.

Figure 3:
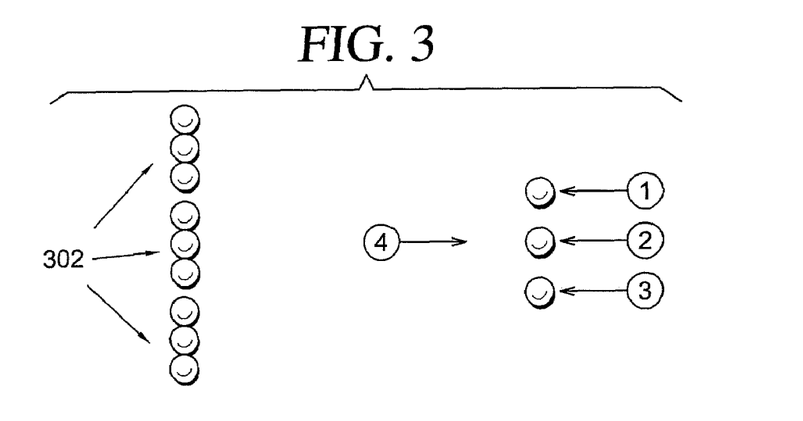
FIG. 3 is a warning light panel.

FIG. 3 shows a fuel warning indicator which includes a series of green, yellow and red LEDs 302. As the fuel level gets lower the green and then the yellow LEDs are extinguished and the red LEDs are illuminated.

Figure 4:
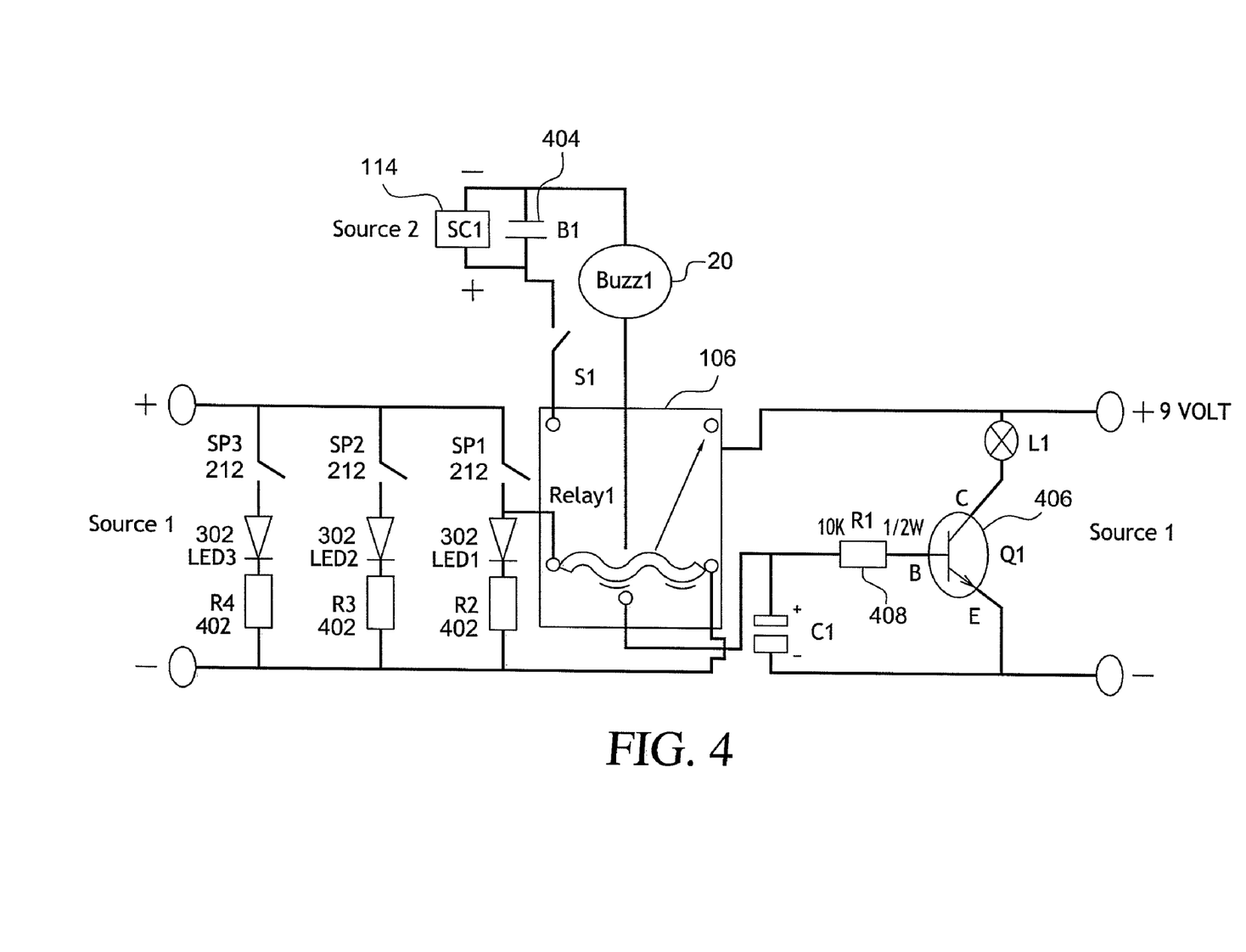
FIG. 4 is a schematic diagram of a generator protection circuit.

FIG. 4 illustrates an electrical schematic diagram of the protection circuit. Each pair of spring contacts 212 is connected in series with green, yellow and red LEDs 302, respectively, and current limiting resistors 402.

The relay 106 is also actuated when the fuel level is low. When the relay 106 is actuated, the electrical circuit is completed so that the solar/generator charged battery 404 energizes the audible alarm 110. The relay also provides power to a transistor 406 which sends a signal to initiate the counter in the timer circuit. A current limiting resistor 408 reduces the input current to the base of the transistor 406 and a capacitor 58 reduces rapid voltage fluctuations.

Figure 5:
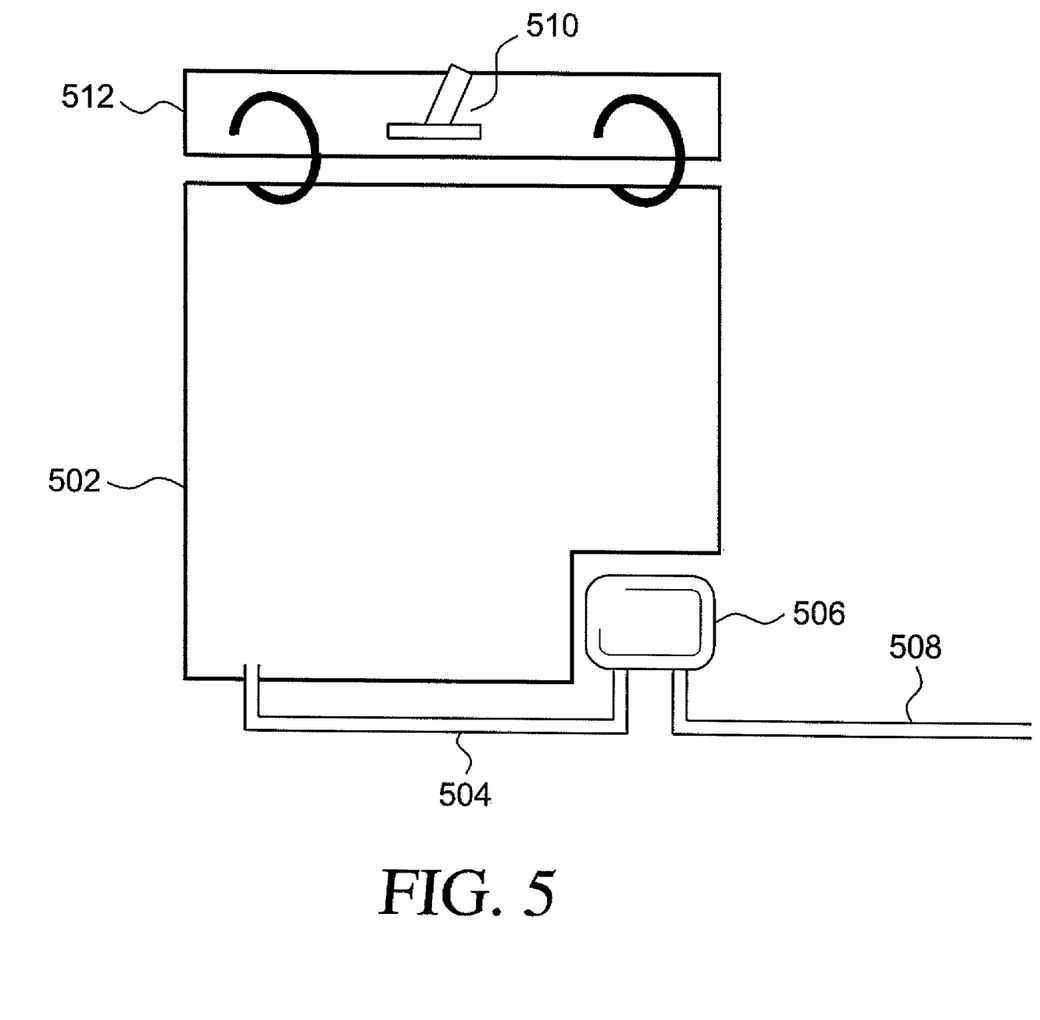
FIG. 5 is a cross-section view of a reserve fuel tank.

Referring to FIG. 5, in the event that the fuel runs out suddenly, a reserve tank 502 that can be installed in a vehicle is used to provide additional fuel. The tank 502 has a fuel line 504 connected to a pump 506 which pumps fuel through a filler hose 508. The pump is operated by an operation switch 510 which provides power to the pump 506 from the car battery. An aluminum bracket 512 is used to install the tank 502 in the car and maintains the tank in a fixed position to prevent it from tipping or spilling.

Figure 6:
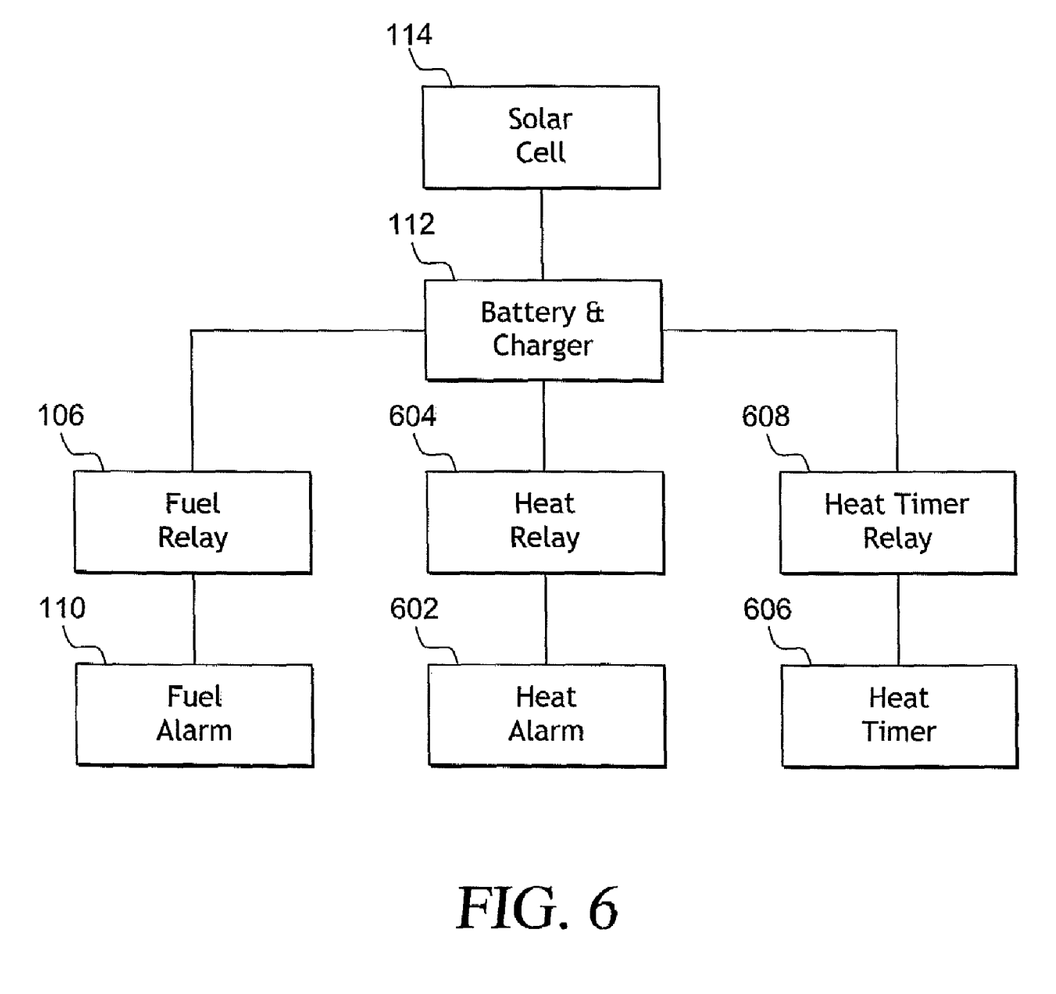
FIG. 6 is a block diagram of a protection system.
Figure 7:
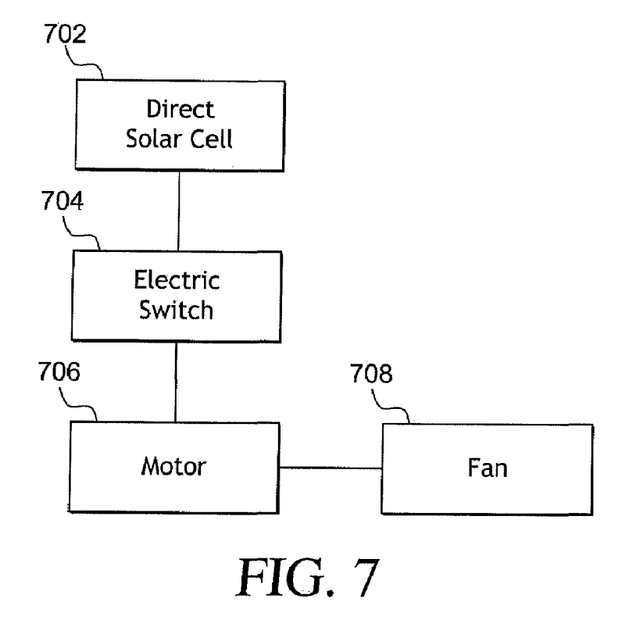
FIG. 7 is a block diagram of a solar powered motor.

Referring to FIG. 6, the protection system may have more than one relay to protect the electric generator from malfunctioning. In addition to providing power to the relay 106 that triggers the fuel alarm 110, the solar cell 114 and battery 112 may power a heat alarm 602 that is triggered by a relay 604 to warn the operator of a potential overheating problem. In addition, a heat timer 606, which is triggered by another relay 608, may issue a shut-down signal to the electric generator after a short time delay if the high heat condition is not alleviated. Referring to FIG. 7, is a solar cell 702 that is connected to a switch is used to drive a small motor 706 of a fan 708.

Figure 8:
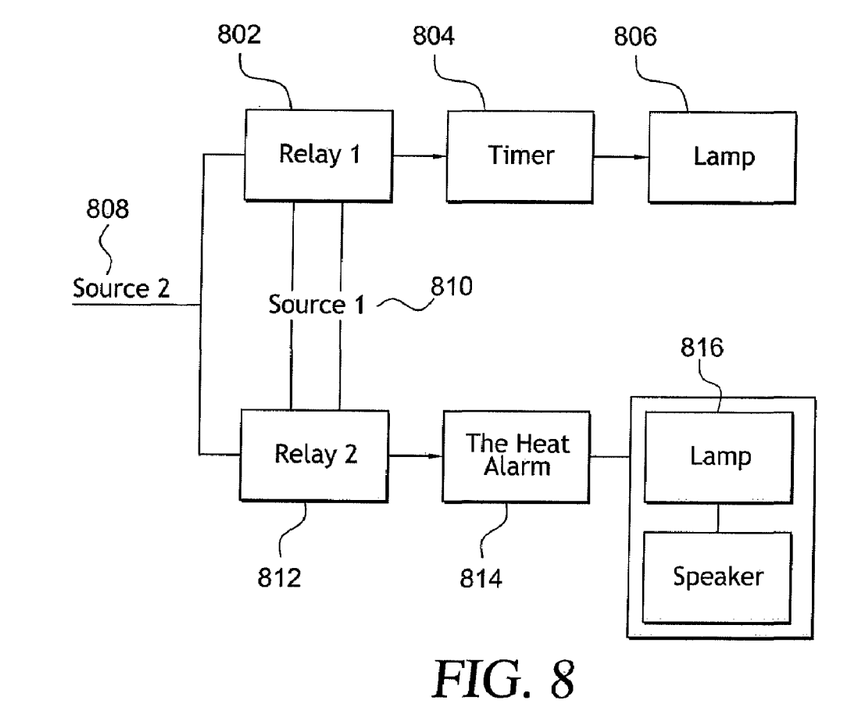
FIG. 8 is a block diagram of a heat alarm circuit.

FIG. 8 shows a more detailed view of the heat alarm with a relay 802 which is connected to a timer 804 which is in turn connected to a lamp 806. Source 1 808 refers to the energy provided from an electric generator. Source 2 810 refers to the electric power available from the charged battery. A second relay is connected to a heat alarm which in turn is connected to lamps 816 and a speaker 818. When the generator is switched off, the circuit is powered by the charged battery.

Figure 9:
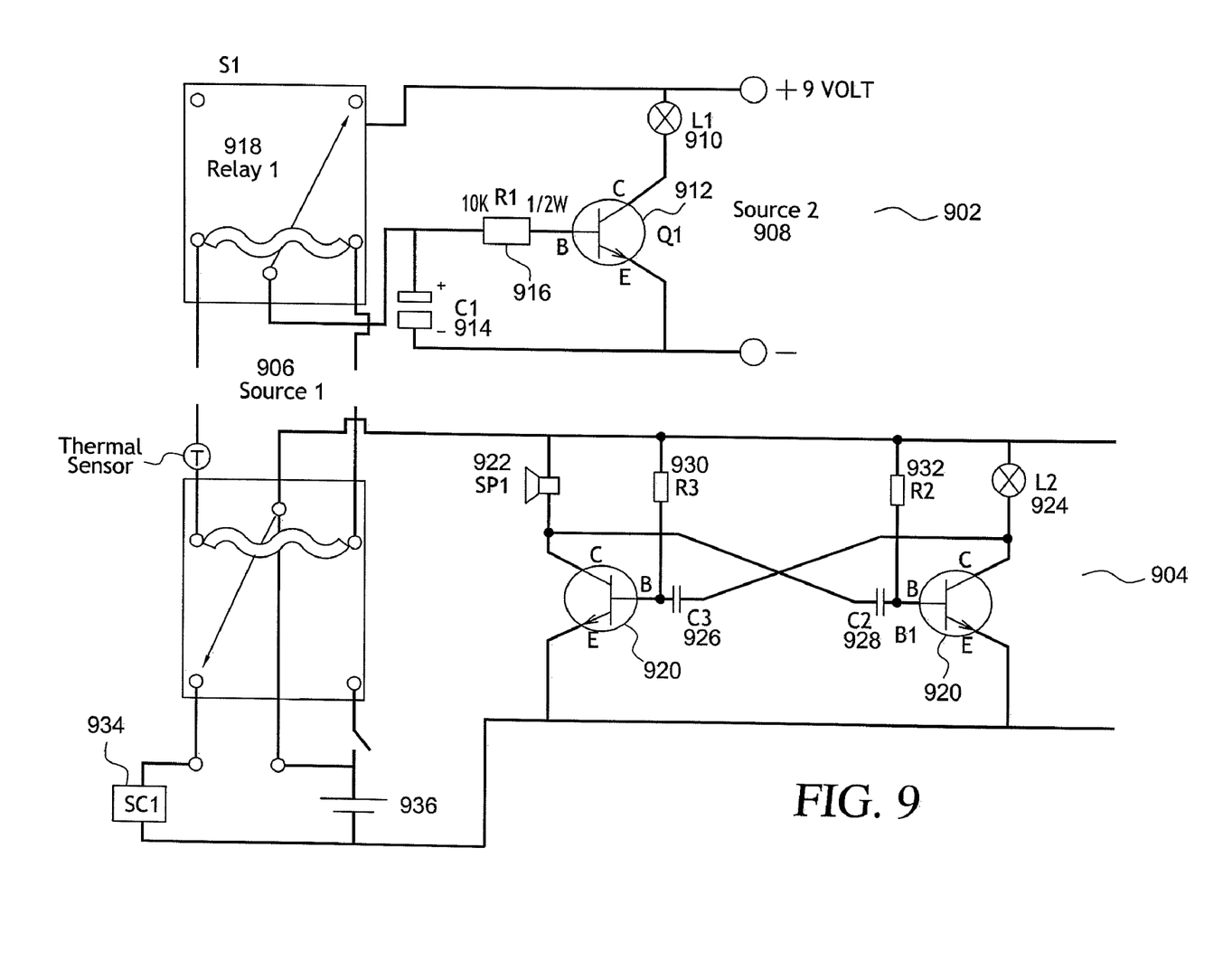
FIG. 9 is a schematic diagram of a heat lamp circuit and a heat alarm circuit.

FIG. 9 is a schematic diagram of a heat lamp circuit 902 and a heat alarm circuit 904. The heat lamp circuit is designed to extinguish a lamp 910 after the generator cools off. Source 1 906 refers to a 9 volt, 0.5 ampere power supply and source 2 908 is a 9 volt, 3 ampere power supply. L1 910 is a lamp connected to a transistor 912 in the heat lamp circuit 902. C1 914 and R1 916 are a capacitor and resistor, respectively, that are connected to the base of the transistor 912. Relay 1 918 switches off the timer after one second if the generator shuts off.

Transistors 920 are used in the heat alarm circuit 904 to actuate a speaker 922 and a warning lamp 924, in what is referred to as a "bi-stable" circuit. Capacitors C3 926 and C2 928 and resistors R3 930 and R2 932 bias the transistors 920 at a determined voltage and current level. SC1 934 is a solar cell that maintains a charge on a 6 volt, 3 ampere battery. S1 is an on/off electrical switch.

Figure 10:
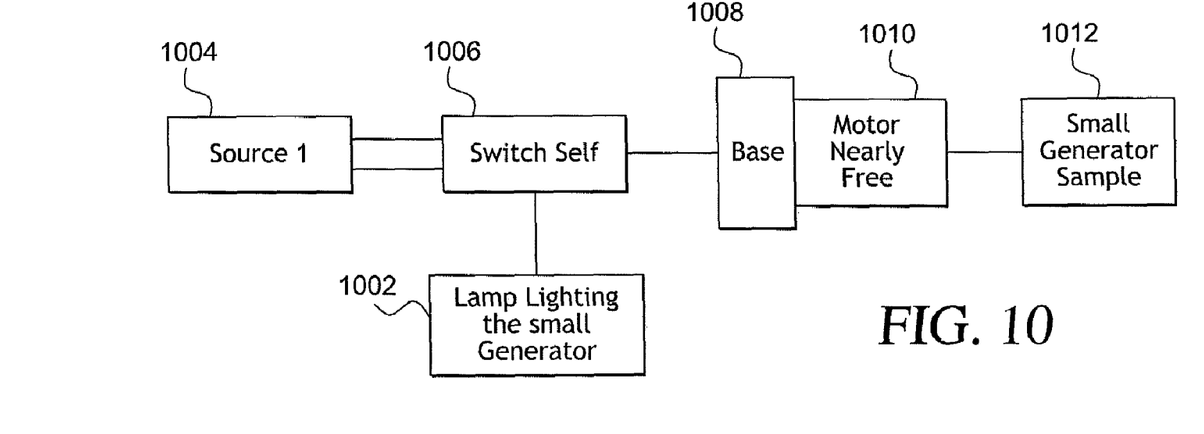
FIG. 10 a lamp circuit to indicate whether the generator is working.

Referring to FIG. 10, a lamp 1002 on the portable screen is used to indicate whether the generator 1004 is working. The portable screen, FIG. 16 can be connected by cable or wireless connection so that it can be seen from inside a building or other structure. A switch 1006 connects the generator 1004 to the lamp circuit. The switch 1006 is also connected to a base 1008, motor 1010 and small generator 1012.

Figure 11:
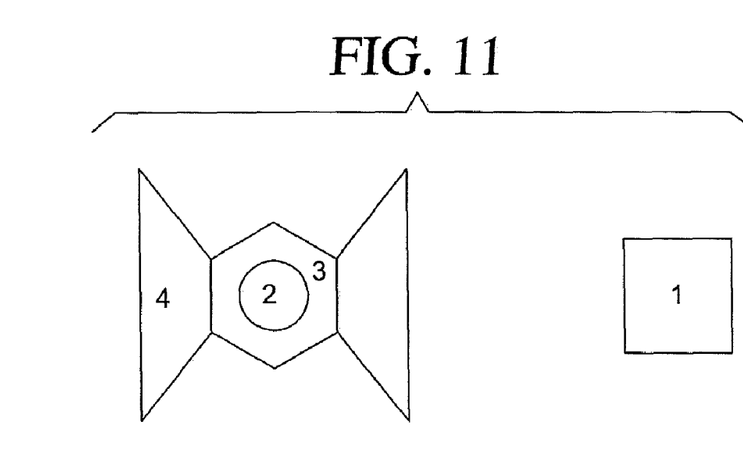
FIG. 11 is a diagram of a portable display screen.

FIG. 11 shows a portable display screen 1 from the back with a motor 2 and a handle 4 used to start the motor.

Figure 12:
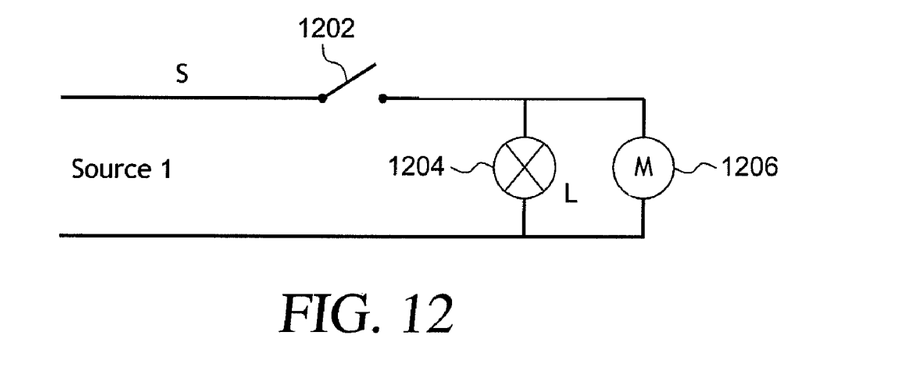
FIG. 12 is a lamp circuit connected to the main generator.

FIG. 12 is a circuit connected to the main generator. A switch on the portable screen is used to switch the main generator on. The switch 1202 provides power to a lamp 1204 and a motor 1206 to indicate whether the generator is working.

Figure 13:
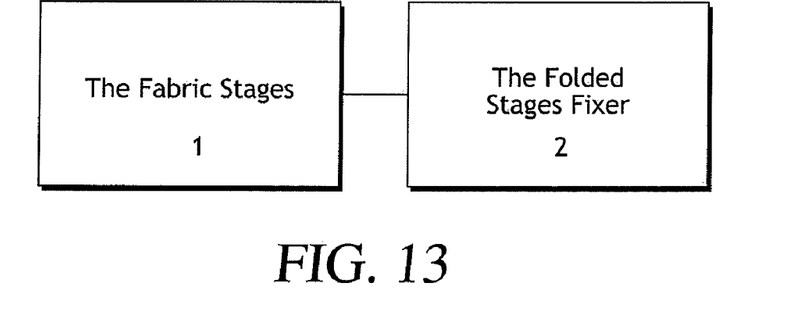
FIG. 13 is a diagram of a fabric window screen.

FIG. 13 is a block diagram of a screen for a window installed in a tent or other structure to use direct solar warming without the use of electric energy. It can be made of plastic or heat-resistant nylon and can allow passage of hot air and fine dust.

Figure 14:
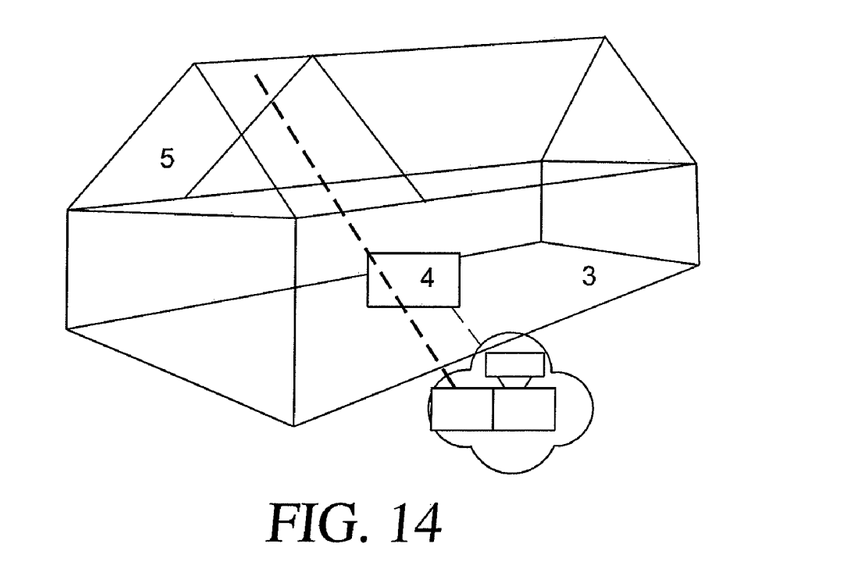
FIG. 14 is a window screen installed in a tent.

FIG. 14 shows the window screen 1402 that can be installed in a window 1404 of tent 1403 or other building structure with a roof 1405.

Figure 15:
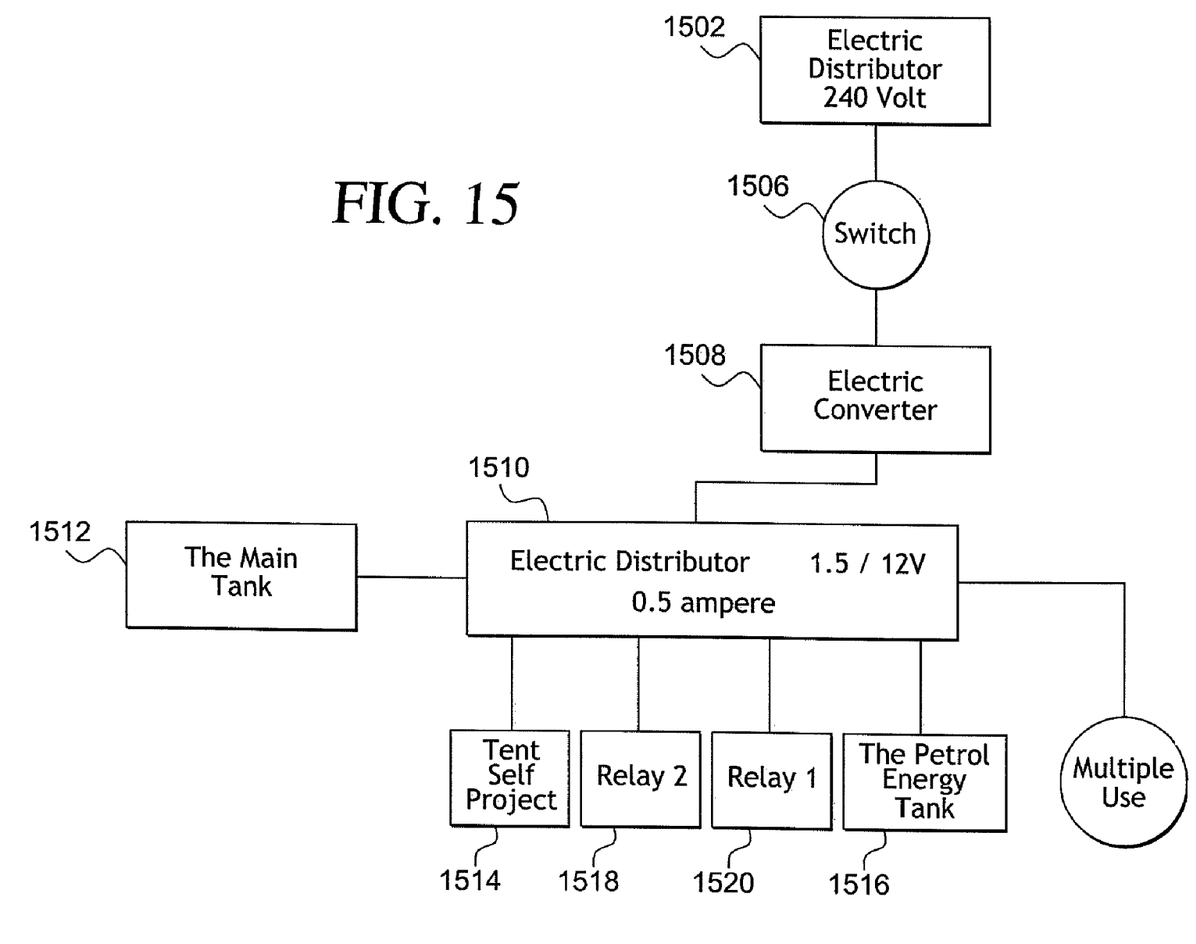
FIG. 15 is a block diagram of an electrical distribution system.

FIG. 15 is a diagram of an electric distribution system which includes 240 volt electric distribution sources 1502. A switch 1506 connects the 240 volt distribution source 1502 to an electric converter 1508. The converter 1508 provides a low voltage of between 1.5 to 12 volts to an electric distribution panel 1510. The distribution panel 1510 distributes the low voltage power to the electric devices in the main tank 1512, tent 1514 and petrol tank 1516 and to the relays 1518, 1520.

Figure 16:
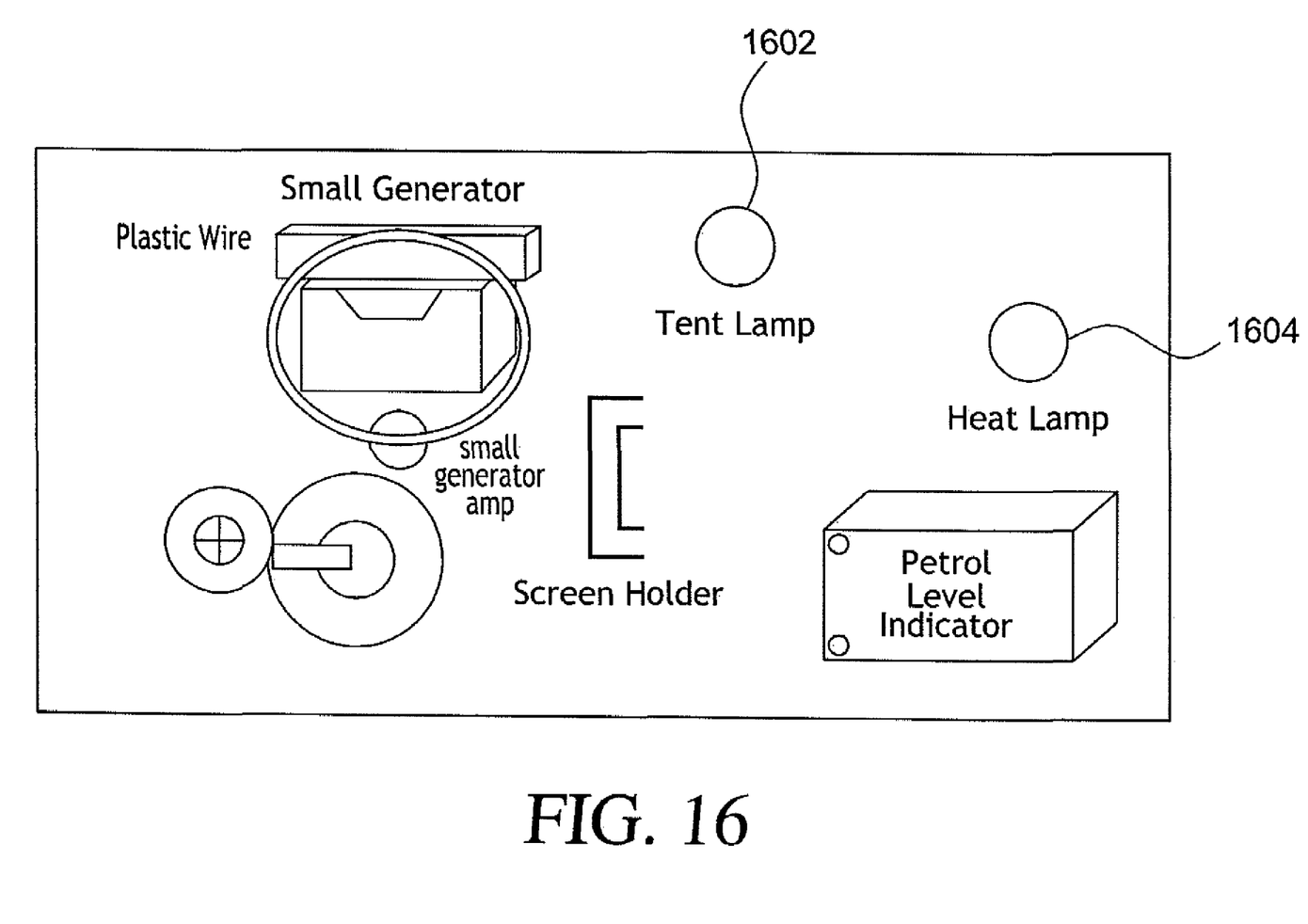
FIG. 16 is a portable display panel.

FIG. 16 is a display panel with status indicators that include a tent lamp 1602, heat lamp 1604, petrol level speaker 1606 and motor 1608.

While the invention has been described in connection with its preferred embodiments, it should be recognized that changes and modifications may be made therein without departing from the scope of the appended claims.

What is claimed is:

1. A protection system for an electric generator comprising:
- a fuel tank and a fluid sensor that includes a float to measure a fluid level in said fuel tank;
- a conductive block and a rod to attach the float to the conductor block and spring contacts to contact said conductive block;
- a set of indicator lamps receiving signals from said fluid sensor and said indicator lamps including a green LED lamp to indicate a high fluid level, a yellow LED lamp to indicate a half-full fluid level and a red LED lamp to indicate a nearly empty fluid level;
- an isolation wall having a port that receives said rod and that separates said spring contacts from the volume of fluid in said fuel tank;
- a clock timer to measure a time interval beginning in response to a low fluid signal from said fluid sensor;
- a low fuel switch to shut off the electric generator at the end of the time interval;
- an audible alarm to indicate a nearly empty fluid level;
- a battery pack to provide backup electric power to the protection system;
- a solar cell and a battery charger to recharge the batteries when an audible alarm indicates a nearly empty fuel level;
- a thermal sensor and a high temperature switch to shut off the electric generator in response to a high temperature signal from said thermal sensor; and
- a reserve fuel tank and a pump to deliver fuel to the fuel tank in response to a low fuel signal from the fluid sensor.

2. A protection system for an electric generator according to claim 1 that includes a heat timer to issue a shut down signal to shut down the electric generator after a short time delay if the high temperature condition is not alleviated.

3. A protection system for an electric generator according to claim 1 that includes a switch and a fan to cool the electric generator subsequent to an indication of an elevated temperature.

* * * * *

UNITED STATES PATENT AND TRADEMARK OFFICE
CERTIFICATE OF CORRECTION

| | | |
|---|---|---|
| PATENT NO. | : 7,617,725 B2 | Page 1 of 1 |
| APPLICATION NO. | : 11/683748 | |
| DATED | : November 17, 2009 | |
| INVENTOR(S) | : Fahed Alhuwaishel | |

It is certified that error appears in the above-identified patent and that said Letters Patent is hereby corrected as shown below:

On the title page item (76), the inventor's last name is hereby corrected to read as "ALHUWAISHEL".

Signed and Sealed this

Eighth Day of March, 2011

David J. Kappos
*Director of the United States Patent and Trademark Office*